(12) United States Patent
Hjerpe (10) Patent No.: US 7,428,818 B2
(45) Date of Patent: Sep. 30, 2008

(54) SYSTEM AND METHOD FOR AUGMENTING POWER OUTPUT FROM A GAS TURBINE ENGINE

(75) Inventor: Carl-Johan Hjerpe, Nacka (SE)

(73) Assignee: Gas Turbine Efficiency AB (SE)

( * ) Notice: Subject to any disclaimer, the term of this patent is extended or adjusted under 35 U.S.C. 154(b) by 567 days.

(21) Appl. No.: 11/224,306

(22) Filed: Sep. 13, 2005

(65) Prior Publication Data

US 2007/0059159 A1    Mar. 15, 2007

(51) Int. Cl.
*F02C 3/30* (2006.01)
*F02C 7/00* (2006.01)

(52) U.S. Cl. .......................... 60/775; 60/39.53; 60/801; 134/23

(58) Field of Classification Search ................. 60/39.53, 60/39.54, 39.55, 39.58, 772, 775, 801; 134/23, 134/198
See application file for complete search history.

(56) References Cited

U.S. PATENT DOCUMENTS

| | | | | |
|---|---|---|---|---|
| 2,689,456 A | * | 9/1954 | White | 60/805 |
| 3,623,668 A | * | 11/1971 | Freid et al. | 60/39.53 |
| 5,193,976 A | * | 3/1993 | Kolev et al. | 415/116 |
| 5,867,977 A | | 2/1999 | Zachary et al. | |
| 6,073,637 A | * | 6/2000 | Hayward et al. | 134/22.1 |
| 6,250,064 B1 | | 6/2001 | Tomlinson et al. | |
| 6,553,768 B1 | * | 4/2003 | Trewin et al. | 60/39.53 |
| 6,659,715 B2 | * | 12/2003 | Kuesters et al. | 60/39.53 |
| 2002/0141882 A1 | | 10/2002 | Ingistov et al. | |
| 2006/0243308 A1 | | 11/2006 | Asplund et al. | |
| 2007/0000528 A1 | | 1/2007 | Asplund et al. | |

FOREIGN PATENT DOCUMENTS

WO    2004/055334    7/2004
WO    2005/028119    3/2005

* cited by examiner

*Primary Examiner*—Louis J Casaregola
(74) *Attorney, Agent, or Firm*—DLA Piper US LLP (57) ABSTRACT

The present invention discloses a method and system for augmenting shaft output of stationary gas turbines that can be used in multiple modes of operation. The system comprises a washing unit (25, 27, 28) adapted to inject a spray (26) of atomized liquid so as to impinge on the compressor blades (12) in order to wet said blades (12), thereby obtaining a release of fouling material from said blades (12); and at least one liquid injection unit (21, 23, 24, 29, 210, 212, 214, 215, 216) adapted to inject a spray (22, 211, 213) of atomized liquid into an air stream of said turbine duct (101) or at the gas turbine (10) in order to increase a mass flow of said air flow, wherein the power output from said gas turbine engine can be augmented. With the invention follows also benefits such as fuel savings and improved environmental performance by reduction of emissions.

43 Claims, 6 Drawing Sheets

SYSTEM AND METHOD FOR AUGMENTING POWER OUTPUT FROM A GAS TURBINE ENGINE

FIELD OF THE INVENTION

This invention generally relates to the field of stationary gas turbines. A gas turbine engine comprises of a rotor inside a casing. The rotor comprises of a compressor for compressing ambient air and a turbine for expanding the exhaust gases. The compressed air is delivered to a combustor burning fuel together with the compressed air resulting in combustion gases expanding through the turbine. The turbine drives the compressor. As the turbine power output is greater than the compressor power requirement, surplus power is available on the shaft. The surplus power is used for driving loads such as a generator, a pump, a compressor, a propeller or alike. The present invention particularly relates to a method and system for augmenting shaft output of stationary gas turbines that can be used in multiple modes of operation. With the invention follow benefits such as fuel savings and improved environmental performance by reduction of emissions.

BACKGROUND OF THE INVENTION

Gas turbines consume large quantities of air. Gas turbines are strongly dependant on the ambient air condition for their performance. The air temperature, pressure and water content impact on the gas turbine compressor's capability to compress the air and thereby will impact on the gas turbine's performance. It is known that with high ambient temperatures follow a power output loss while at cold temperatures follows a power output increase.

There are three key parameters that have a strong impact on the performance of the gas turbine. These are the mass flow, the pressure ratio and the compression efficiency. Gas turbines are constant volume machines, i.e. they operate according to fixed geometries. This means that if the air increases in density, the mass flow will also increase. The mass flow is the most dominant engine performance parameter as the mass flow is directly proportional to the engine power output.

The power loss at high ambient temperatures has drawn attention to several innovative technologies for restoring the lost power. One widely practiced method is cooling the inlet air by evaporation of water. This can be practised by scrubbing of the inlet air in a water scrubber. As the water evaporates water latent heat is exchanged for air sensible heat. The evaporation allows the air to pick up humidity till saturation is reached. For a dry and hot desert climate this may result in very significant cooling of the air. The evaporative cooling technology has two effects on the gas turbine performance, first the lower temperature increases the density and thereby the mass flow. Second, the mass of the evaporated water is added to the mass flow.

A variant to the water scrubber is the water spray technology where nozzles positioned in the inlet air duct upstream of the compressor inlet atomize water. By pumping water at high pressure the nozzles atomize the water into a mist of fine droplets (fog). The size of the droplets is typically in the range of 5 to 30 microns. These small droplets are carried with the air stream through the duct and will evaporate before entering the compressor. However, this method requires good control of air psychometrics and engine air flow. If too much water is pumped the air may not be able to pick it up as humidity and all droplets will not evaporate. The excess water will wet the duct walls where it may cause corrosion and a flooding problem. On the other hand too little water flow will not saturate the air.

A drawback with the scrubber and the sprayer method as described above is that the cooling effect is limited by how much water the air can pick up before reaching saturation. An alternative method with a higher cooling effect is the inlet air chilling technology. This technology comprise of a refrigeration unit that cools the inlet air by the heat being picked up by the refrigeration unit. This technology allows for cooling of the inlet air to lower temperatures compared to what evaporative cooling may do. However, a draw back with this method is the high costs for the unit investment which has shown to limit the applicability of this method.

Returning to the evaporative cooling technology by spraying a water mist, this has some benefits. The cooling effect is high with respect to the relative simplicity of the equipment. At sites with a hot and dry climate typically 15% power boost is achievable. Occasionally, as high as 25% power boost has been reported. However, as the temperature changes from night to day so will the water requirement also change. Good pump equipment must be designed to provide just the right amount of water. Too much water will result in "overspray" as the air can not pick up the excess water. The excess water may harm operations as it may result in corrosion damage and flooding of the air duct. The contrary situation with too little water will not saturate the air and full cooling effect will not be accomplished. Ambient conditions vary by seasonal changes as well as by the hour. This further sets stringent requirements on the pump unit. The lower pump flow limit is set by where the accomplished power boost result is of negligible advantage and the higher pump flow limit is set by the few days of the year with exceptionally dry and hot weather. For a given weather situation and engine load situation, follows a precise amount of water to reach saturation. In practise this result in a wide range for the pump capacity. A common engineering solution is to arrange multiple pumps in a cascade, i.e. several pumps are connected in parallel where pump #1 has a small capacity, pump #2 has twice the capacity of pump #1, pump #3 has twice the capacity of pump #2, and so on. Typically five pumps make up the pump skid. By running one, two or more pumps in different combinations a very large range of pump capacities is accomplished.

Yet another method for power output augmentation is related to cooling of the compressor. Cooling of the compressor results in less compression work which, in turn, results in more surplus power available on the shaft. Cooling of the compressor is preferably practised by spraying a mist of fine droplets into the compressor gas path where the evaporation and cooling takes place inside the compressor. E.g. the nozzles are installed in the space in between the compressor discs. The rapid temperature rise inside the compressor as of the compression work acts as a driving force for the evaporation process. This technology is known as "wet compression" and is practised with success. An alternative to installing nozzles inside the compressor is to install them in front of the compressor inlet. The same wet compression will take place.

Yet another method of augmenting gas turbine power output is injecting water into the gas turbine combustor. Here the water evaporates with the hot combustion gases and form steam. The steam together with the combustion gases expands through the turbine. The turbine output is increased as of the contribution by the steam mass flow. Further, the water cools the flame which in turn will allow for more fuel to be burnt while yet maintaining the same firing temperature. This latter effect provides additional power output. Besides augmenting power, another feature of the combustor injection method is that it is very efficient in reducing NOx emissions. The formation of NOx is strongly coupled to high flame temperature. With water injection into the combustor the flame is cooled and thereby is NOx formation suppressed.

Another issue of concern is the build up of fouling in the compressor. Air breathing machines like gas turbines consume large quantities of air. Air contains foreign particles in form of aerosols which enters the compressor and adheres to components in the compressor gas path. Compressor fouling results in a change in the properties of the boundary layer air stream of the gas path components. The deposits result in an increase of the component surface roughness. As air flows over the component the increase of surface roughness results in a thickening of the boundary layer air stream. The thickening of the boundary layer air stream has negative effects on the compressor aerodynamics. At the blade trailing edge the air stream forms a wake. The wake is a vortex type of turbulence with a negative impact on the air flow. The thicker the boundary layer the stronger the wake turbulence. The wake turbulence together with the thicker boundary layer has the consequence of reducing mass flow through the engine. The reduced mass flow is the most remarkable effect from compressor fouling. Further, the thick boundary layer and the strong wake turbulence result in a reduced compression pressure gain which in turn results in the engine operating at a reduced pressure ratio. Anyone skilled in the art of thermodynamic working cycles understands that a reduced pressure ratio result in a lower efficiency of the engine. The reduction in pressure gain is the second most remarkable effect from compressor fouling. Further, fouling of the compressor reduces the compressor isentropic and polytropic efficiency. Reduced compressor efficiency means that the compressor requires more power for compressing the same amount of air. As the power for driving the compressor is taken from the turbine via the shaft, there will then be less surplus power available to drive the load.

The only known way to combat fouling is to wash it away. Washing can be conducted with the engine being shut down. The engine shaft is then cranked by the use of its starter motor while wash liquid is injected into the compressor. Fouling is released by the act of the chemicals and mechanical movement during cranking. The liquid and the released fouling material are transported to the exhaust end of the engine by the air flow. This procedure is called "crank" washing or "off-line" washing. An alternative to crank washing is "on-line" washing. Here the engine is washed while in operation. "On-line" washing is also called "fired" washing as the engine is firing fuel during washing. During on-line washing liquid is injected into the compressor while the rotor is spinning at high speed. Due to high rotor speeds and short retention time for the liquid, the wash efficacy is not as good compared to the crank wash. But the method has the advantage of allowing washing during operation.

However, even though, as indicated above, there exist a large number of different techniques for augmenting the power output of gas turbine engines, such as a stationary gas turbine engine, there is no known technique that is able to provide an increased power output over a wide range of operating conditions as the same time as it offers a cost efficient and user-friendly solution.

BRIEF DESCRIPTION OF THE INVENTION

Thus, one object of the present invention is to provide a multipurpose method and system for augmenting the power output of gas turbine engine, and in particular a stationary gas turbine engine, that provide an increased power output over a wide range of operating conditions.

Another object of the present invention is to provide a multipurpose method and system for augmenting the power output of gas turbine engine, and in particular a stationary gas turbine engine, that provide a cost efficient and user-friendly solution.

These and other object are achieved according to the present invention by providing a method and a system having the features defined in the independent claims. Preferred embodiments are defined in the dependent claims.

According to a first aspect of the present invention, there is provided a system for augmenting power output from a gas turbine engine comprising a turbine duct arranged at a gas turbine, in turn, including a combustor and a compressor having a number of compressor blades. The system is characterized by a pump unit comprising a variable speed pump adapted to increase a pressure of a liquid; a control unit connected to the pump unit via a signal feed and adapted to control the speed of the pump; a washing unit connected to the pump unit via a feed line, the washing unit comprising at least one nozzle and at least one valve connected to the pump unit via the feed line and to the at least one nozzle via a conduit and being adapted to control a flow rate of liquid being fed to the at least one nozzle, the at least one nozzle of the washing unit being adapted to inject a spray of atomized liquid so as to impinge on the compressor blades in order to wet the blades, thereby obtaining a release of fouling material from the blades; and at least one liquid injection unit comprising at least one nozzle and at least one valve connected to the pump unit via the feed line and to the at least one nozzle via a conduit and being adapted to control a flow rate of liquid being fed to the at least one nozzle, the at least one nozzle of the liquid injection unit being adapted to inject a spray of atomized liquid into an air stream of the turbine duct in order to increase a mass flow of the air flow, wherein the power output from the gas turbine engine can be augmented.

According to a second aspect there is provided a method for augmenting power output from a gas turbine engine comprising a turbine duct arranged at a gas turbine including a combustor and a compressor having a number of compressor blades. The method comprises the steps of: increasing a pressure of a liquid using a pump unit comprising a variable speed pump; controlling a speed of the pump unit using a control unit connected to the pump unit via a signal feed; supplying a liquid to a washing unit connected to the pump unit via a feed line, the washing unit comprising at least one nozzle and at least one valve connected to the pump unit via the feed line and to the at least one nozzle via a conduit; controlling a flow rate of liquid being supplied to the at least one nozzle using the valve; injecting a spray of atomized liquid so as to impinge on the compressor blades in order to wet the blades, thereby obtaining a release of fouling material from the blades, using the at least one nozzle of the washing unit; supplying a liquid to at least one liquid injection unit connected to the pump unit via a feed line, the at least one liquid injection unit comprising at least one nozzle and at least one valve connected to the pump unit via the feed line and to the at least one nozzle via a conduit; controlling a flow rate of liquid being supplied to the at least one nozzle using the valve; and injecting a spray of atomized liquid into an air stream of the turbine duct using the at least one nozzle of the liquid injection unit in order to increase a mass flow of the air flow, wherein the power output from the gas turbine engine is augmented.

According to a further aspect of the present invention there is provided a computer program product loadable into a memory of a digital computer device, including software code portions for performing steps of the method according to the second aspect of the present invention when the computer program product is run on the computer device.

The present invention is thus based on the idea of increasing the mass flow in order to increase the gas turbine power output. This invention is based on using water as a media for increasing the engine mass flow and thereby increasing the power output. In addition, the use of water not only increase the power output but also result in environmental benefits such as reduced emissions. The invention combines at least one of: the evaporative cooling method, the compressor intercooling method, and the combustor flame cooling method with the engine wash method in an inventive manner. These methods are all based on the use of water and it is a purpose of this invention to provide methods for practising evaporative cooling, compressor intercooling, combustor flame cooling and engine washing based on water.

Evaporative cooling, compressor intercooling, combustor flame cooling or engine wash are established technologies servicing gas turbines all over the world. However, this invention discloses a how these technologies can be combined on the same gas turbine and result in synergetic effects previously not known. Further, the invention discloses how common hardware is used and thereby reducing the cost for practising the invention. The common hardware has its base in the use of water at high pressure as operating media where the advantageous operational effects are found from combining the wash technology with at least one of evaporative cooling, compressor inter cooling or combustor flame cooling technologies. The system is thereby a multipurpose unit for providing multiple functions for enhancing gas turbine performance. The advantageous effects will further be described in the preferred embodiments of this invention. For reference to known technologies, the following patents are cited: U.S. Pat. No. 6,718,771 to Kopko include an evaporative cooling system enabling gas turbine operations at high temperatures. U.S. Pat. No. 5,868,860 to Asplund discloses the use of high liquid pressure for washing of gas turbine compressors. U.S. Pat. No. 6,644,935 to Ingistov describes a nozzle assembly for interstage compressor water injection. U.S. Pat. No. 3,976,661 to Cheng describes power augmentation effects by injecting water into the combustor.

According to the invention as further described in the preferred embodiments, the invention, i.e. the evaporative cooling method, the compressor intercooling method, the combustor flame cooling method and the engine wash method, can be practised from only one pump if the pump skid is appropriately engineered for that service. It is the purpose of this invention to provide a system for practising evaporative cooling, compressor intercooling, combustor flame cooling and engine washing from only one pump.

According to the invention as further described in the preferred embodiments requires water to be available at high pressure and at a considerable variation in flow rate. As described above, state of the art pump technology is practising a system with multiple parallel pumps, typically 5 pumps, each one with different flow capacities. By running one, two or more pumps in different combinations a very large range of pump capacities is accomplished. This invention discloses the use of one variable speed pump where the speed is governed by frequency and where the appropriate frequency is set by a frequency controller. It is the purpose of this invention to simplify the hardware by use of only a single pump for practicing evaporative cooling, compressor intercooling, combustor flame cooling and engine wash.

It is found from experience that practising evaporative cooling, compressor intercooling, combustor flame cooling or engine wash seldom is done according to a fixed schedule. For example; as the air temperature change by the hour, so will the feasibility for evaporative cooling also change. Another example; as the season changes air pollen pollution may result in different fouling characteristics and thereby a different need for washing. These two cases and many more cases require a continuous overview of the engine operating status. Ad hoc decisions are required for an optimized operational result. According to the invention evaporative cooling, compressor intercooling, combustor flame cooling and engine wash when conducted by the same pump skid will simplify the operations as further described in the preferred embodiment of this invention. It is the purpose of this invention to simplify operations.

According to the invention evaporative cooling, compressor intercooling, combustor flame cooling or engine wash is conducted by the same pump skid which simplifies the operations as well as make more use of the hardware investment. It is clear that if a wash unit is procured from one supplier and an evaporative cooling unit from another supplier, it result in a high investment cost for the two units. Further, it requires significant operator constraints to run several stand-alone units from an operational, spare parts and service requirement point of view. According to the invention one pump unit is used for evaporative cooling, compressor intercooling, combustor flame cooling or engine wash which reduces the capital investment, spare parts and service requirements. It is the purpose of this invention to reduce the capital investment, spare parts and service requirement.

As a consequence of practising the methods described above waste water will be emanating from the engine. The water may leave as water vapour through the stack or may show up in a condensed form. Especially in the case of crank washing, wash water will flood out from the engine exhaust end. This water contains released fouling material as well as oils, fats and metal ions coming from the engine itself. This water is hazardous and must be collected and treated. Water may also show up in the inlet air duct when evaporative spray cooling is practised. This water must also be collected and treated. It is the purpose of this invention to provide a unit for treating waste water. The treated waste water can be used for washing again and thereby providing a system with no liquid water emissions. Further, the reused water reduces the total water consumption. It is the purpose of this invention to avoid liquid water emissions and to reduce water consumption by providing a closed loop liquid water system.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DESCRIPTION OF THE PREFERRED EMBODIMENTS

Gas turbines have found a wide use in various applications such as for power generation, for gas compression and many other mechanical drive applications. The description below is focused on a gas turbine in a power station service. However, the invention is not limited to this application. Anyone skilled in the art can practise the methods differently and yet be in the objectives of the invention.

Figure 1:
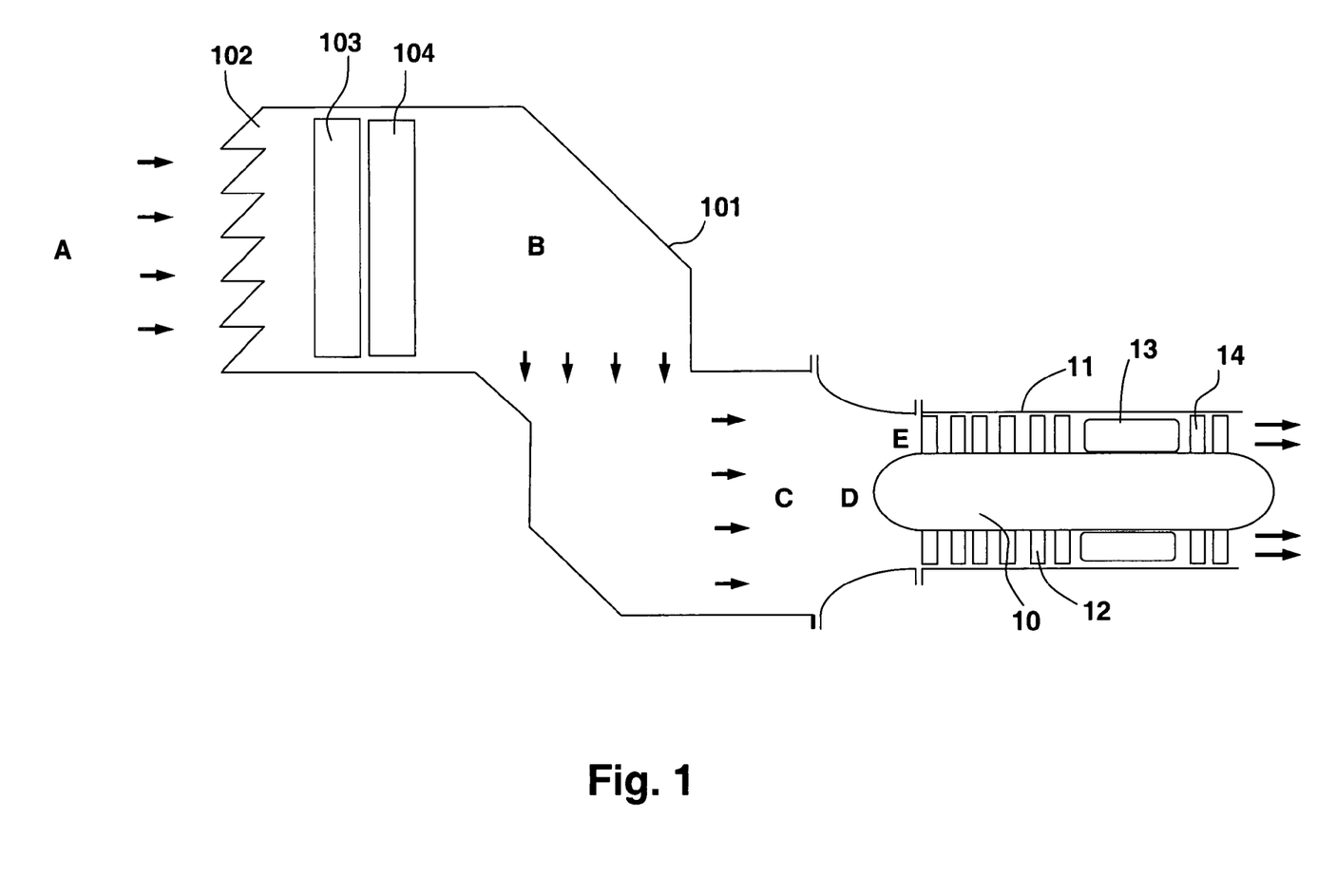
FIG. 1 shows a typical configuration of the inlet air section of such gas turbine.

A power station gas turbine is typically installed in an enclosure where the enclosure provides weather protection and reduces the emissions of sound. The enclosure has an inlet for the inlet air to the gas turbine and an outlet for emission of exhaust gases. FIG. 1 shows a typical configuration of the inlet air section of such gas turbine. Arrows shows the direction of the air flow. Ambient air enters duct 101 via weather louver 102, via trash screen 103, via air filter 104 to the inlet of gas turbine 10. Gas turbine 10 comprises of a rotor with blades and an outer casing 11. At the front end of the shaft compressor blades 12 compress the air to high pressure, typically 10 to 30 times. The compressed air is delivered to combustor 13. Fuel (not shown) is fired in the combustor. The hot combustion gases expand through turbine 14 and leave the plant through an exhaust duct (not shown).

According to the invention nozzles are installed in the inlet duct area as well as in the compressor and combustor. To understand why the nozzles have the characteristics they have it is necessary to know the environment in which the nozzles work. Returning to FIG. 1, ambient air A passes the weather louver, trash screen and filter with moderate velocity, typically 10 m/s. From area B the air moves to area C still with moderate velocity. The air now enters the inlet plenum section of the gas turbine, area D. Inlet plenum 19 is shaped as a bellmouth as to allow for acceleration of the air. At the compressor inlet face E the air velocity is typically half the speed of sound or 180 m/s. The purpose of the acceleration is to obtain the high velocity required by the compressor to do the compression work. Once inside the compressor the air velocity is reduced as of the higher density by compression. When passing into the combustor chamber velocities are typically less than 100 m/s. Nozzles that spray water into the compressor and into the combustor are subject to release the water into a high density environment. In addition the geometries are small. The small geometries, high velocity and high density set stringent requirements on the nozzles.

Figure 2:
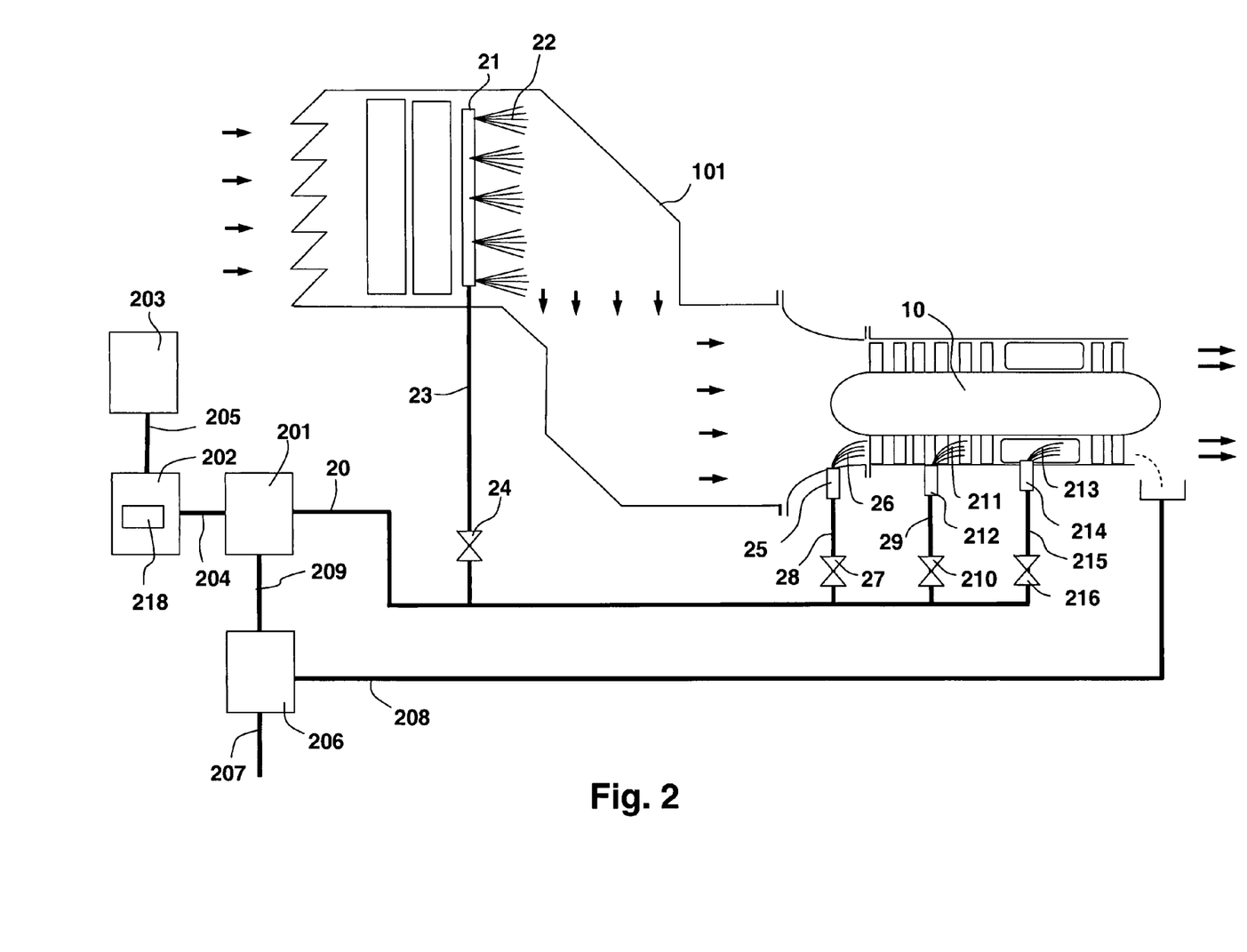
FIG. 2 shows an embodiment of a system according to the present invention installed at a stationary gas turbine.

FIG. 2 shows the air inlet to the stationary gas turbine described in FIG. 1. FIG. 2 show the application of an evaporative cooling system, a wash system, a compressor intercooling system and a combustor flame cooling system according to the invention. The evaporative cooling system is a "fogging" system where water is sprayed into a mist of fine droplets (fog) that evaporates. Further, the wash system is a system for spraying water into the compressor inlet. Further, the compressor intercooling system is a "wet compression" system for spraying water into a high density air stream at a compressor interstage. Finally, the combustor cooling system is a system for spraying water into the combustor.

FIG. 2 shows pump skid 201 (details not shown) comprising of a pump for pumping liquid to high pressure. The pump unit comprises of a displacement type pump driven by a frequency controlled electric AC motor where the frequency governs the pump speed. Alternatively, the pump unit may comprise an alternative motor such as a DC motor where the motor current governs the pump speed. The pump raises the liquid pressure to maximum 140 bar, preferably 35 bar, more preferably 70 bar. This pressure is found to be optimal for this multipurpose service practicing evaporative cooling, compressor intercooling, engine wash and combustor flame cooling. The pump's maximum capacity is set in relation to the rated gas turbine's air flow. The pump capacity is sized according to the ratio of liquid flow and air mass flow where the liquid flow is the nominator and air flow the denominator. The ratio is in the range 0.3 to 0.5 when liquid is expressed as litre per minute and air flow as kg per seconds. This ratio is found to be optimal for this multipurpose service practicing evaporative cooling, compressor intercooling, engine wash and combustor flame cooling.

Heated water may be advantageous to use, e.g. for compressor washing. For this purpose pump skid 201 includes tanks and heaters for providing heated water. Further, chemicals may be advantageous to use as wash detergents during washing or as compressor corrosion inhibitors at completion of an operating period. For this purpose pump skid 201 includes a liquid injection unit for injecting liquid chemicals into the water.

Pump skid 201 is controlled by a control unit 202. Control unit 202 (details not shown) comprises of manual controls and programmable controls enabling operation of the pump unit via a signal feed 204. The control unit 202 includes storage means 218. The storage means 218 may include a random access memory (RAM) and/or a non-volatile memory such as read-only memory (ROM). As will be appreciated by one of ordinary skill in the art, storage means may include various types of physical devices for temporary and/or persistent storage of data which includes solid state, magnetic, optical and combination devices. For example, the storage means may be implemented using one or more physical devices such as DRAM, PROMS, EPROMS, EEPROMS, flash memory, and the like. Moreover, the storage means 218 may comprise a computer program product including software code portions for performing the method steps in accordance with the invention when the computer program product is run on the computer device, for example, controlling an opening degree of a valve in order to, in turn, control a flow rate of a liquid being supplied to a nozzle.

Control unit 202 may be controlled from a control room or from a panel by the pump unit. An operator unit 300, see FIG. 3, may be installed in the control room connected to the control unit 202 via signal feed 301 and including an input device such as a keyboard 302, which allows an operator to input, for example, control commands for the pump unit, and a display or screen 304 for presenting information related operation of the pump unit, for example, time history of the operating parameters, or status information of the pump. Accordingly, the operator can monitor the operation of the pump as well as different operating parameters associated to the operation thereof via the display 304. According to another embodiment, the display is a touch sensitive screen and in this case a number of soft-keys can be arranged on the screen in order to present different commands at different presented interfaces on the display. Furthermore, the operator unit 300 may comprise storage means (not shown), which, in turn, may include a random access memory (RAM) and/or a non-volatile memory such as read-only memory (ROM). As will be appreciated by one of ordinary skill in the art, storage means may include various types of physical devices for temporary and/or persistent storage of data which includes solid state, magnetic, optical and combination devices. For example, the storage means may be implemented using one or more physical devices such as DRAM, PROMS, EPROMS, EEPROMS, flash memory, and the like.

Figure 3:
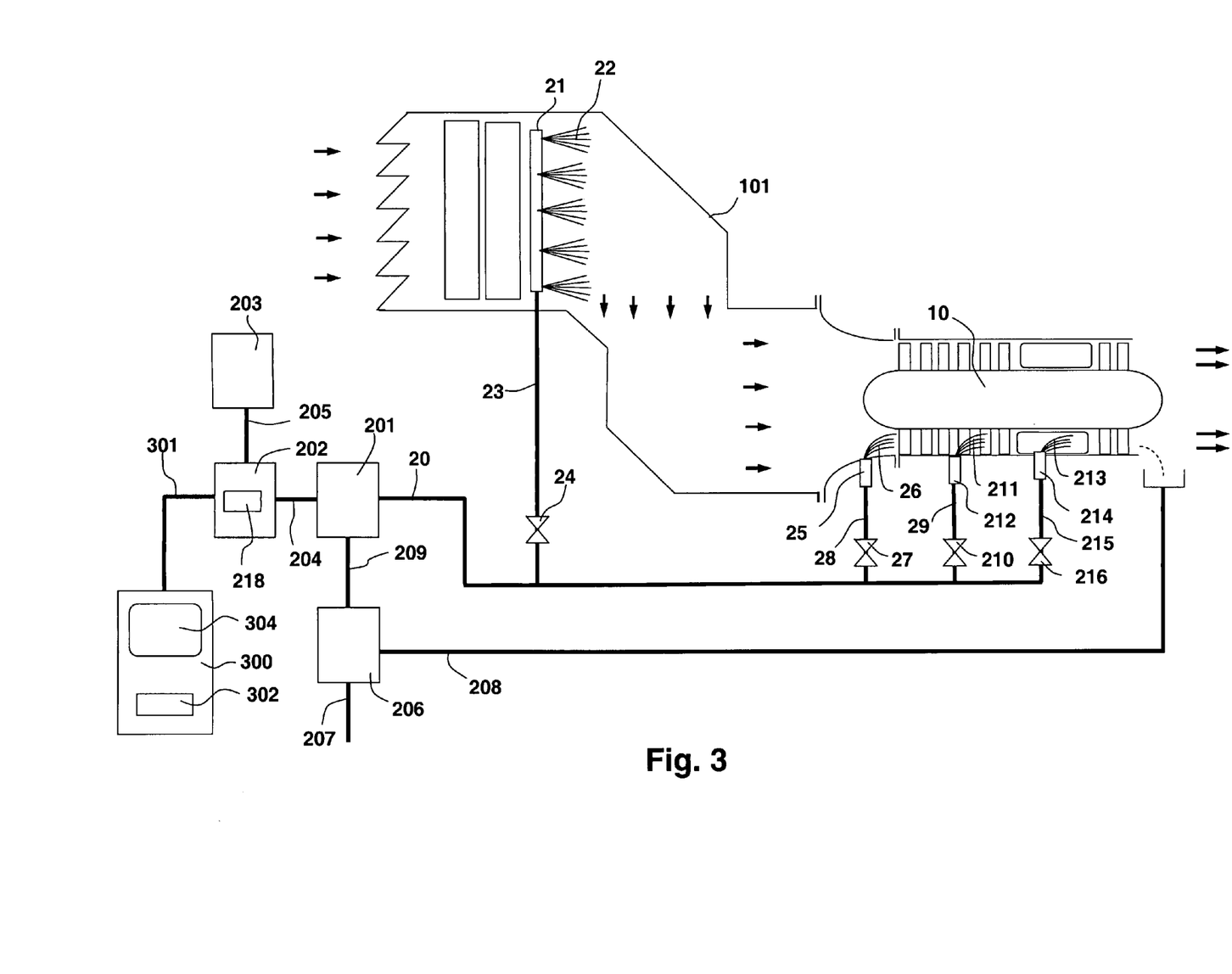
FIG. 3 shows another embodiment of the system according to the present invention installed at a stationary gas turbine.

As the ambient conditions are an important input to the gas turbine's performance, a weather monitor 203 is connected to control unit 202 via signal 205. Weather monitor 203 (details not shown) comprises of a dry bulb thermometer and an air humidity measuring device. Alternatively may the weather monitor comprise of a dry bulb thermometer and a wet bulb thermometer. The weather information is processed by control unit 202 where control unit 202 delivers to the operator key operational information such as allowable evaporation water quantity, icing risk, etc. This information may, for example, be presented for the operator on the display 304.

The process shown in FIG. 2 is water consuming. Water make-up unit 206 comprises (details not shown) of a water processing unit such as particle separation filters and deionization filters. Raw water form a water source (not shown) is supplied via conduit 207 to water make-up unit 206. Alternatively, water may be supplied from water drains in the gas turbine unit and fed to water make-up unit 206 via conduit 208. Unit 206 purifies the water to "de-mineralized" water quality. The water is suitable for injection into the gas turbine's gas path. The highly purified water is fed to pump unit 201 via conduit 209.

The pressurized liquid emanating from the pump skid is fed to pipe header 20. Pipe header 20 acts as a distributor of high pressure water to different users such as the evaporative cooling system, the wash system, the compressor intercooling system and the combustor flame cooling system.

The evaporative cooling system will now be described. To pipe header 20 is connected conduit 23 via valve 24. When valve 24 opens high pressure water is fed to nozzle holder 21. Nozzle holder 21 is installed inside the duct and far upstream of the compressor inlet face. Nozzle holder 21 comprises typically of a tube with multiple nozzles which atomizes water into spray 22. The droplets are carried with the air stream and will evaporate prior to entering the compressor as there is sufficiently long residence time for the air travel from the nozzle tip to the compressor inlet. The evaporation exchanges water latent heat for air sensible heat so that the air temperature is lowered by the evaporation. A lower air temperature means a higher density of the air. As gas turbines are constant volume machines this means that the mass flow will increase with the cooling of the air. A higher mass flow result in a higher shaft output. The nozzles atomize the water into fine droplets typically in the range of 1-50 microns, and preferably in the range of 10-30 microns. The small droplets are the result from atomization at 35-140 bar pressure. The required liquid flow rate is set by the variable speed pump. The evaporative cooling operation is closed by shutting valve 24.

The on-line washing system will now be described. On-line washing is characterized by washing while the engine is running. During on-line washing the engine is firing fuel while the rotor spins at high speeds and the air enters the compressor at high velocity. To header 20 is conduit 28 connected via valve 27. When valve 27 opens high pressure liquid is fed to nozzle 25. Nozzle 25 is installed upstream of the compressor inlet face. Nozzle 25 atomise the liquid into spray 26. Nozzle 25 is essentially directed towards the compressor inlet. The liquid has a high nozzle exit velocity as of the high pressure. This high velocity spray will penetrate into the high velocity air stream. The spray is carried with the air stream into the compressor. Inside the compressor the droplets impinge on compressor blades and vanes and thereby wetting them. Wetting of the blades and vanes will release fouling material. The compressor is thereby cleaned. Cleaning result in reduced boundary layer thickness which will increase the mass flow. The increase in mass flow will increase the engine power output. Spray 26 comprises of droplets in the size range of 50-500 microns, and preferably in the range of 70-200 microns. The droplet size is the results of atomization at 35-140 bar pressure. The required liquid flow rate is set by the variable speed pump. To shut down the wash operation valve 27 is closed.

The off-line washing system will now be described. The same set of nozzles is used for off-line washing as for on-line washing. Off-line washing is characterized by low rotor speeds and low air velocities from cranking the shaft by the engine's starter motor. During off-line washing the engine is not firing fuel. To header 20 is conduit 28 connected via valve 27. When valve 27 opens high pressure liquid is fed to nozzle 25. Nozzle 25 is installed upstream of the compressor inlet face. Nozzle 25 is essentially directed towards the compressor inlet. Nozzle 25 atomise the liquid into spray 26. As the nozzles are essentially directed towards the compressor inlet, liquid enters the compressor. These droplets are of suitable size as to impinge on the compressor blades and vanes and thereby wetting them. Wetting of the blades and vanes will release fouling material. The compressor is thereby cleaned. Cleaning result in reduced boundary layer thickness when the engine is operating. A reduced boundary layer thickness increases the mass flow. The increase in mass flow will increase the engine power output. Spray 26 comprises of droplets in the size range 50-500 microns, and preferably in the range of 70-200 microns. The droplet size is the results of atomization at 35-140 bar pressure. The required liquid flow rate is set by the variable speed pump. To shut down the wash operation valve 27 is closed. Alternatively, a different set of nozzles may be used for off-line washing although the principal operation will be as described above.

The compressor intercooling system will now be described. The compressor intercooling system according to the invention is a wet compression system. By wet compression means that liquid in form of small droplets are allowed to evaporate inside the compressor during the compression work. The retention time for the air through a compressor is in the range of milliseconds. During this time the droplets shall evaporate. This is possible to achieve if the initial droplets are small. Further, the rapid temperature rise as of the compression work result in a strong driving force for evaporation. To header 20 is conduit 29 connected via valve 210. When valve 210 opens high pressure liquid is fed to nozzle 212. Nozzle 212 is installed to inject liquid into the compressor gas path. E.g. nozzles may be installed to inject liquid in between two disks. Nozzle 212 atomise the liquid into spray 211 consisting of small droplets. The small droplets will evaporate before exiting the compressor. The evaporation cools the air and thereby increases the air density. The increased density enhances a mass flow increase which will result in a higher power output. Further, mass flow is increased by the addition of the water mass. Further, the cooling of the compressor results in a lower compressor exit temperature. This result in cooler air to the combustor which means that more fuel can be fired while maintaining a constant firing temperature. Firing more fuel will increase the power output. Spray 211 comprises of droplets in the size range of 1-50 microns, and preferably in the range of 5-30 microns. These small droplet sizes are the results from atomization at 35-140 bar pressure. The required liquid flow rate is set by the variable speed pump. To shut down the wet compression operation valve 210 is closed. Alternatively may nozzles for wet compression be installed upstream of the compressor inlet. The principal operation will be the same as for the interstage mounted nozzles as per the description above.

The combustor cooling system will now be described. The combustor cooling system comprises of nozzles for injecting droplets of water into the combustor. The water latent heat is exchanged for flame sensible heat and thereby suppressing flame temperature. To header 20 is conduit 215 connected via valve 216. When valve 216 opens high pressure liquid is fed to nozzle 214. Nozzle 214 atomise the liquid into spray 213. The flame will evaporate the water into steam. The power augmenting effect comes from the mass flow contribution by the steam expanding through the turbine. Further, as the flame temperature is suppressed more fuel can be fired while maintaining a constant firing temperature. Firing more fuel will provide additional power output. Spray 213 comprises of droplets in the size range of 20-500 microns, and preferably in the range of 50-200 microns. These small droplet sizes are the results from atomization at 35-140 bar pressure. The required liquid flow rate is set by the variable speed pump. To shut down the combustor cooling valve 216 is closed.

Some additional design features are worth mentioning. Pipe header 20 and conduit 28, 29 and 215 may comprise of a hydraulic type high pressure flex hose. The flex hose will simplify installation. Alternatively may a fixed pipe be installed. Valves 24, 27, 210 and 216 are opened or closed from the control room. Alternatively, the valves may be manually opened or closed.

It may also seem unnecessary with both an evaporative cooler and a compressor intercooler as they essentially do the same task. However, there is a difference in that the compressor intercooler may be strongly limited in capacity as of difficulties to install a large number of required nozzles in the small geometries of the compressor. On the other hand the evaporative cooler has the advantage of an easy and low cost installation in the inlet air duct but operating the evaporative cooler is limited at low temperatures as of freezing risk. It is clear that there are operational conditions where one system is more favourable than the other. This is also exemplified by an example below.

In practical installations it may be found that the evaporative cooling, the compressor intercooling, the combustor flame cooling or the wash systems may all not be required at a particular site. However, the minimum requirement is the wash system and at least one of the evaporative cooling, the compressor intercooling or the combustor flame cooling systems.

Figure 4:
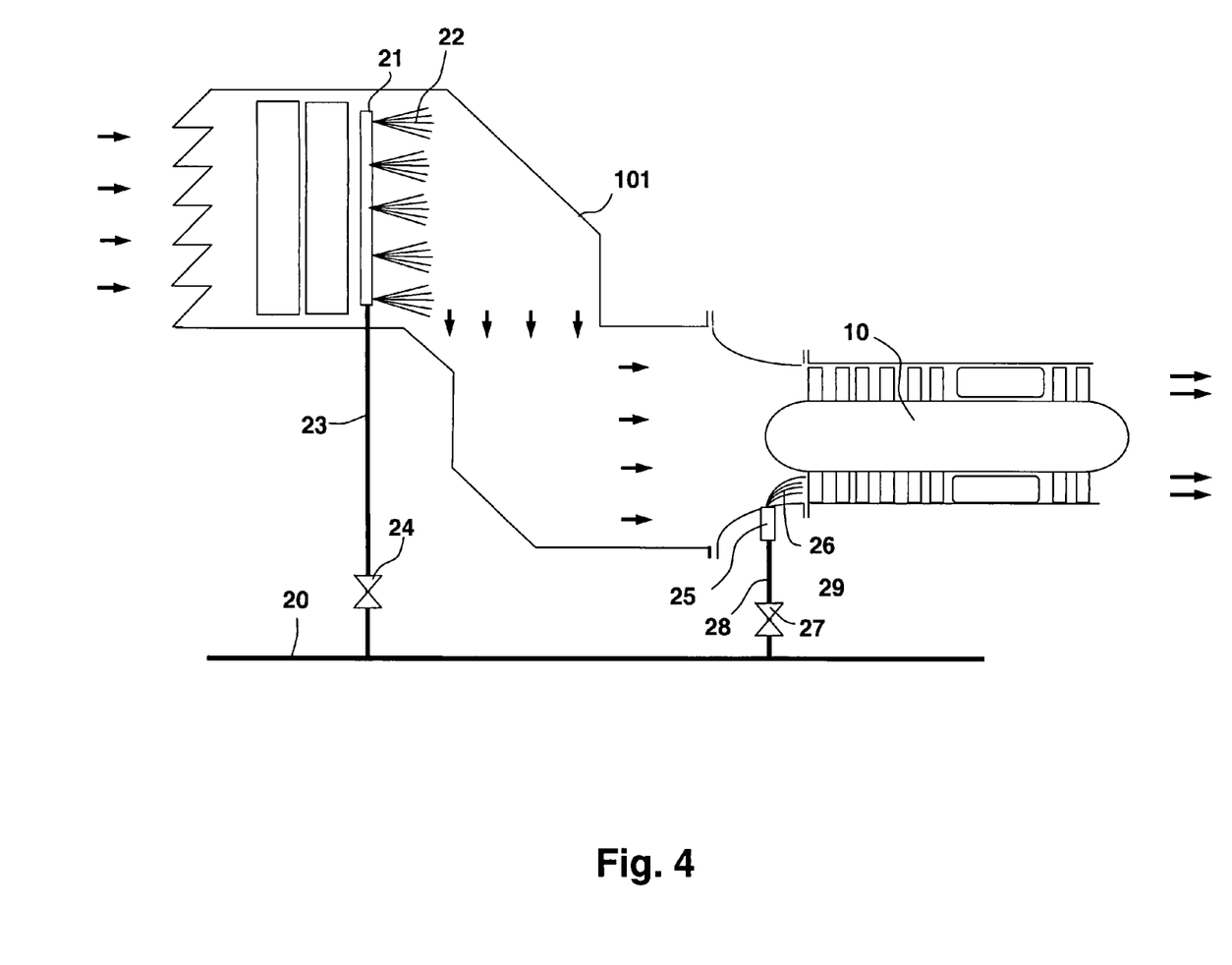
FIG. 4 shows an embodiment of the system according to the present invention including the washing unit and the evaporative cooling unit.

In FIG. 4 an embodiment of the system according to the present invention including the washing unit and the evaporative cooling unit is shown. Like parts in FIGS. 2, 3 and 4 are denoted with the same reference numerals. The description of the included parts will be omitted since they have been described above with reference to FIG. 2.

Figure 5:
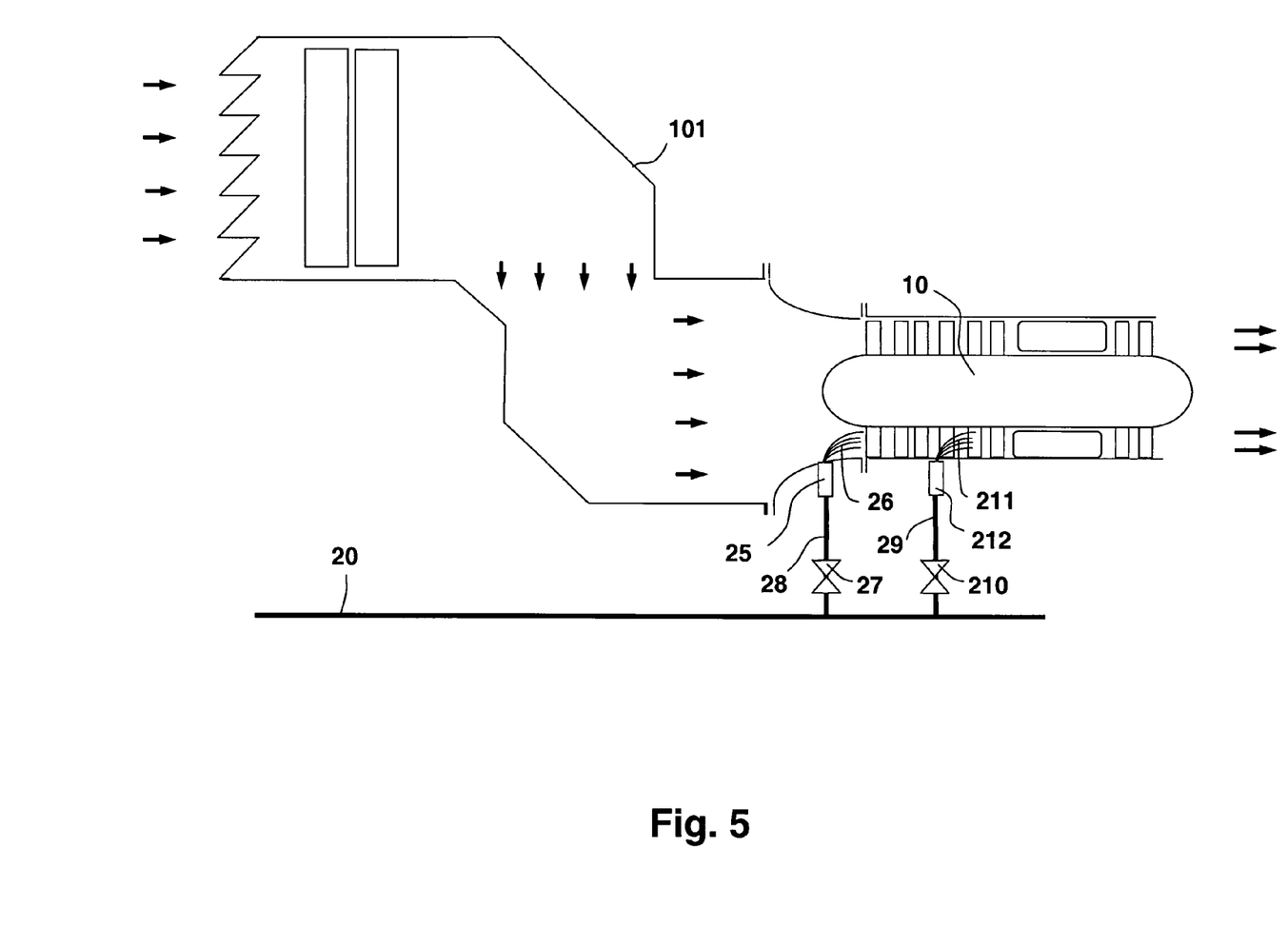
FIG. 5 shows an embodiment of the system according to the present invention including the washing unit and the compressor intercooling unit.

Turning now to FIG. 5, an embodiment of the system according to the present invention including the washing unit and the compressor intercooling unit is shown. Like parts in FIGS. 2, 3 and 5 are denoted with the same reference numerals. The description of the included parts will be omitted since they have been described above with reference to FIG. 2.

Figure 6:
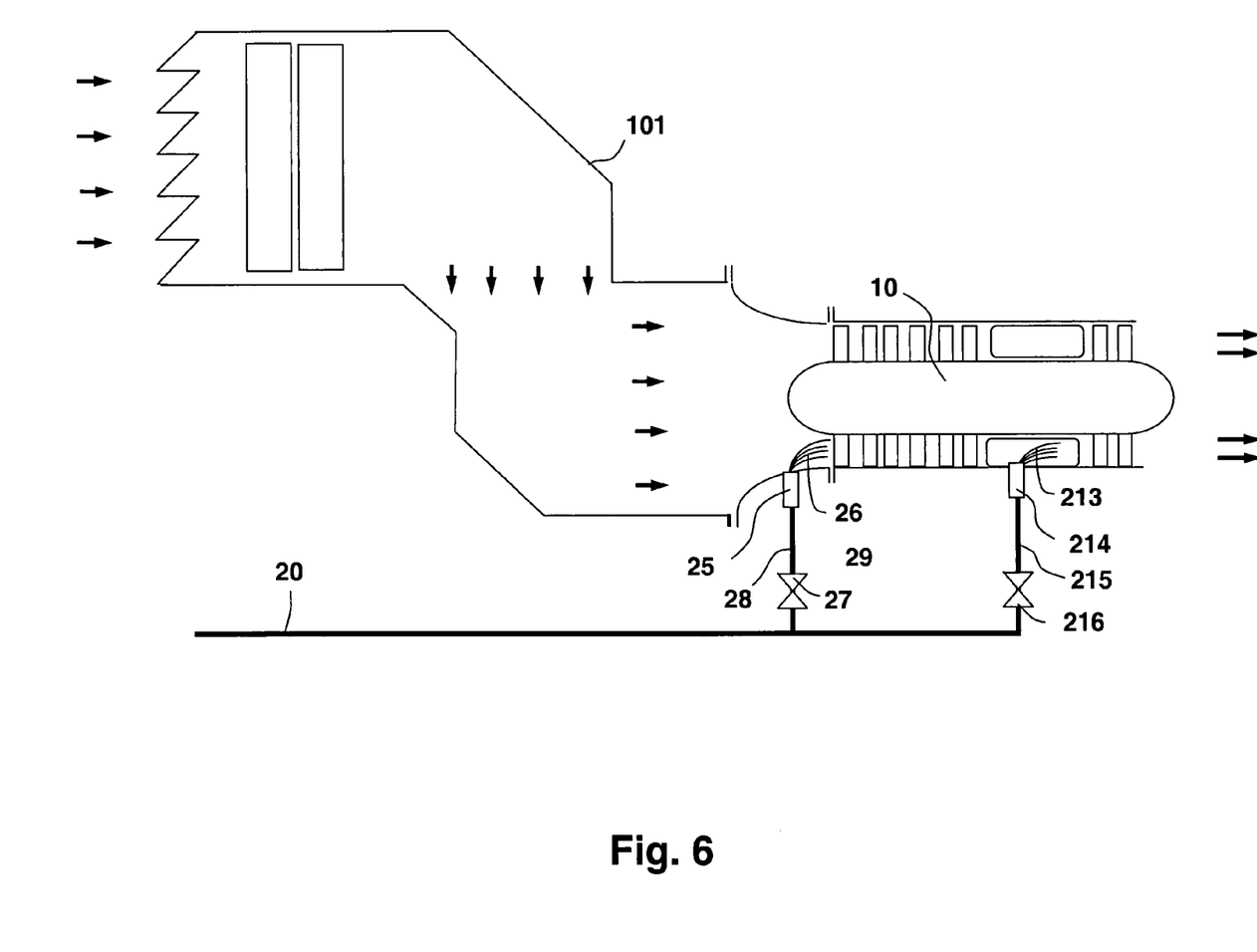
FIG. 6 shows an embodiment of the system according to the present invention including the washing unit and the combustor cooling unit.

With reference to FIG. 6, an embodiment of the system according to the present invention including the washing unit and the combustor cooling unit is shown. Like parts in FIGS. 2, 3 and 6 are denoted with the same reference numerals. The description of the included parts will be omitted since they have been described above with reference to FIG. 2.

An additional feature of the invention is the capability of reducing NOx. NOx is reduced by the water. NOx formation is the result of flame temperature and temperature retention time. Water has a high sensible heat which has the positive effect that the heating of the water by the flame extends the time to when the flame reaches its final temperature. This is shown to be very efficient in suppressing the NOx formation. Special operating schemes for NOx abatement is not addressed here as this is best established from actual site requirements.

There are additional benefits by the invention as the use of water reduces the fuel consumption. The reduced fuel consumption is the result of gas turbine components such as the compressor and the turbine operating more efficiently. Special operating schemes for reducing fuel consumption are not addressed here.

A feature of the invention is the flexibility to turn on and off systems according to what is most operationally advantageous. It is possible to swiftly activate one system and deactivate another system when desired. This is shown by two examples below. The flexibility is not limited to the two examples. Experience from actual installations will open numerous possibilities for the operator to enhance his production output and maximize his operation profits by the invention.

EXAMPLES

Example 1

In this example the operator runs his gas turbine plant as a "power peaker", i.e. the plant is in operation only limited hours a day for the purpose of supplying extra power when the grid demands it. The operator activates the evaporative cooling as to augment the power output. This is done by starting pump unit 201 and opening valve 24. The other valves on pipe header 20, i.e. valve 27, 210 and 216, are closed. In this mode of operation the evaporative spray cooling is running resulting in a fog upstream of the compressor. The fog will efficiently cool the air as the droplets evaporate. However, fogging has the disadvantage of coalescing airborne foreign particles which will appear as a wet and sticky fouling of the compressor. Now, it is a desire to wash that fouling away before shutting down so that the next run can start with a clean compressor. The operator accomplishes this by conducting a three minute on-line wash before shutting down. At three minutes before shutdown valve 24 is closed while valve 27 is opened. In this mode of operation the on-line washing is running while the evaporative cooling is shut down. Three minutes later, pump unit 201 is stopped and valve 27 is closed. The on-line wash is now completed and the gas turbine can be shut down.

Example 2

This operator runs a gas turbine in power production and has both evaporative cooler and compressor intercooler installed. He has activated the evaporative cooling unit as to augment his power output. During the night the temperature drops. He is seeing that the air relative humidity is increasing as of the colder temperature. Eventually the dew point temperature will be reached in the morning where water no longer can evaporate. This disables him to use the evaporative cooler.

To maintain his power augmentation capability he decides to switch to compressor intercooling. This is done by closing valve 24 and simultaneously open valve 210. When the sun rises in the morning and the temperature rises the relative humidity is lowered. He now decides to switches back to evaporative cooling by closing vale 210 and simultaneously open valve 23.

The invention claimed is:

1. A system for augmenting power output from a gas turbine engine, said gas turbine engine comprising a turbine duct arranged at a gas turbine including a combustor and a compressor having a number of compressor blades, characterized by:
a pump unit comprising a variable speed pump adapted to increase a pressure of a liquid;
a control unit connected to said pump unit via a signal feed and adapted to control the speed of said pump;
a washing unit connected to said pump unit via a feed line, said washing unit comprising at least one nozzle and at least one valve connected to said pump unit via said feed line and to said at least one nozzle via a conduit and being adapted to control a flow rate of liquid being fed to said at least one nozzle, said at least one nozzle of said washing unit being adapted to inject a spray of atomized liquid so as to impinge on the compressor blades in order to wet said blades, thereby obtaining a release of fouling material from said blades; and
at least one liquid injection unit comprising at least one nozzle and at least one valve connected to said pump unit via said feed line and to said at least one nozzle via a conduit and being adapted to control a flow rate of liquid being fed to said at least one nozzle, said at least one nozzle of said liquid injection unit being adapted to inject a spray of atomized liquid into an air stream of said turbine duct or at said gas turbine in order to increase a mass flow of said air flow, wherein the power output from said gas turbine engine is augmented.

2. The system according to claim 1, further comprising a monitoring unit adapted to monitor environmental conditions and being connected to said control unit.

3. The system according to claim 2, wherein said monitoring unit comprises at least one from the group of: a dry bulb temperature measuring device, an air humidity measuring device, and wet bulb temperature measuring device.

4. The system according to claim 1, further comprising a liquid collecting unit connected to said pump unit and including a liquid processing unit, said collecting unit being adapted to collect liquid emanating from said gas turbine engine and said processing unit being adapted to purify said collected liquid.

5. The system according to claim 1, wherein said control unit is adapted to control said at least one valve of said washing unit and said at least one valve of said liquid injection unit.

6. The system according to claim 1, wherein said at least one liquid injection, unit comprises a nozzle holder comprising a plurality of nozzles and being arranged upstream a compressor inlet face and a valve connected to said nozzle holder via a conduit and adapted to control a flow rate of liquid being fed to said plurality of nozzles, wherein said nozzles are adapted to inject a spray of atomized liquid into an air stream of said turbine duct such that substantially all droplets of said spray evaporate prior to entering said compressor.

7. The system according to claim 6, wherein said plurality of nozzles are adapted to atomize said liquid into droplets at a pressure within the range of 35-140 bar.

8. The system according to claim 7, wherein said plurality of nozzles are adapted to atomize said liquid into droplets in the range of 1-50 microns.

9. The system according to claim 1, wherein said washing unit is adapted to operate during operation of said engine and wherein said at least one nozzle of said washing unit is arranged upstream said compressor and is adapted to inject a spray of atomized liquid at a velocity being sufficiently high to penetrate said air stream produced during operation of said engine.

10. The system according to claim 9, wherein said at least one nozzle of said washing unit is adapted to atomize said liquid into droplets at a pressure within the range of 35-140 bar.

11. The system according to claim 10, wherein said at least one nozzle of said washing unit is adapted to atomize said liquid into droplets in the range of 50-500 microns.

12. The system according to claim 1, wherein said washing unit is adapted to operate when said engine is shut down and wherein said at least one nozzle of said washing unit is arranged upstream said compressor and is directed towards an inlet of said compressor.

13. The system according to claim 12, wherein said at least one nozzle of said washing unit is adapted to atomize said liquid into droplets at a pressure within the range of 35-140 bar.

14. The system according to claim 12, wherein said at least one nozzle of said washing unit is adapted to atomize said liquid into droplets in the range of 50-500 microns.

15. The system according to claim 1, wherein said at least one liquid injection unit comprises at least one nozzle arranged adjacent to said compressor and a valve connected to said nozzle via a conduit and adapted to control a flow rate of liquid being fed to said nozzle, wherein said nozzle is adapted to inject liquid into the compressor gas path.

16. The system according to claim 15, wherein said at least one nozzle is arranged upstream of an inlet of said compressor.

17. The system according to claim 15, wherein said at least one nozzle is adapted to atomize said liquid into droplets at a pressure within the range of 35-140 bar.

18. The system according to claim 15, wherein said at least one nozzle is adapted to atomize said liquid into droplets in the range of 1-50 microns.

19. The system according to claim 1, wherein said at least one liquid injection unit comprises at least one nozzle arranged adjacent to said combustor and a valve connected to said nozzle via a conduit and adapted to control a flow rate of liquid being fed to said nozzle.

20. The system according to claim 19, wherein said at least one nozzle is adapted to atomize said liquid into droplets at a pressure within the range of 35-140 bar.

21. The system according to claim 19, wherein said at least one nozzle is adapted to atomize said liquid into droplets in the range of 20-500 microns.

22. A method for augmenting power output from a gas turbine engine, said gas turbine engine comprising a turbine duct arranged at a gas turbine including a combustor and a compressor having a number of compressor blades, characterized by the steps of:
increasing a pressure of a liquid using a pump unit comprising a variable speed pump;
controlling a speed of said pump unit using a control unit connected to said pump unit via a signal feed;
supplying a liquid to a washing unit connected to said pump unit via a feed line, said washing unit comprising at least one nozzle and at least one valve connected to said pump unit via said feed 1ine and to said at least one nozzle via a conduit;

controlling a flow rate of liquid being supplied to said at least one nozzle using said valve;

injecting a spray of atomized liquid so as to impinge on the compressor blades in order to wet said blades, thereby obtaining a release of fouling material from said blades, using said at least one nozzle of said washing unit;

supplying a liquid to at least one liquid injection unit connected to said pump unit via a feed line, said at least one liquid injection unit comprising at least one nozzle and at least one valve connected to said pump unit via said feed line and to said at least one nozzle via a conduit;

controlling a flow rate of liquid being supplied to said at least one nozzle using said valve; and injecting a spray of atomized liquid into an air stream of said turbine duct or at said gas turbine using said at least one nozzle of said liquid injection unit in order to increase a mass flow of said airflow, wherein the power output from said gas turbine engine is augmented.

23. The method according to claim 22, further comprising the steps of:

monitoring environmental conditions using a monitoring unit; and communicating said monitored conditions to said control unit.

24. The method according to claim 23, wherein, the step of monitoring comprises at least one of the steps of:

measuring a dry bulb temperature;

measuring an air humidity; and measuring a wet bulb temperature.

25. The method according to claim 22, further comprising the steps of:

collecting liquid emanating from said gas, turbine engine; and purifying said collected liquid.

26. The method according to claim 22, further comprising the steps of:

controlling said at least one valve of said washing unit; and controlling said at least one valve of said liquid injection unit.

27. The method according to claim 22, wherein the step of injecting a spray of atomized liquid from a plurality of nozzles into an air stream of said turbine duct in order to increase a mass flow of said air flow comprises the step of:

injecting a spray of atomized liquid into an air stream of said turbine duct such that substantially all droplets of said spray evaporate prior to entering said compressor.

28. The method according to claim 27, wherein said plurality of nozzles are adapted to atomize said liquid into droplets at a pressure within the range of 35-140 bar.

29. The method according to claim 27, wherein said plurality of nozzles are adapted to atomize said liquid into droplets in the range of 1-50 microns.

30. The method according to claim 22, wherein the step of injecting a spray of atomized liquid so as to impinge on the compressor blades in order to wet said blades comprises the step of:

injecting a spray of atomized liquid at a velocity being sufficiently high to penetrate said air stream produced during operation of said engine.

31. The method according to claim 30, wherein said at least one nozzle of said washing unit is adapted to atomize said liquid into droplets at a pressure within the range of 35-140 bar.

32. The method according to claim 30, wherein said at least one nozzle of said washing unit is adapted to atomize said liquid into droplets in the range of 50-500 microns.

33. The method according to claim 22, wherein said washing unit is adapted to operate when said engine is shut down and wherein said at least one nozzle of said washing unit is arranged upstream said compressor and is directed towards an inlet of said compressor.

34. The method according to claim 33, wherein said at least one nozzle of said washing unit is adapted to atomize said liquid into droplets at a pressure within the range of 35-140 bar.

35. The method according to claim 33, wherein said at least one nozzle of said washing unit is adapted to atomize said liquid into droplets in the range of 50-500 microns.

36. The method according to claim 22, wherein the step of injecting a spray of atomized liquid into an air stream of said turbine duct in order to increase a mass flow of said air flow comprises the step of:

injecting liquid into the compressor gas path.

37. The method according to claim 36, wherein said at least one nozzle is arranged upstream of an inlet of said compressor.

38. The method according to claim 36, wherein said at least one nozzle is adapted to atomize said liquid into droplets at a pressure within the range of 35-140 bar.

39. The method according to claim 36, wherein said at least one nozzle is adapted to atomize said liquid into droplets in the range of 1-50 microns.

40. The method according to claim 22, wherein said at least one liquid injection unit comprises at least one nozzle arranged adjacent to said combustor and a valve connected to said nozzle via a conduit and adapted to control a flow rate of liquid being fed to said nozzle.

41. The method according to claim 40, wherein said at least one nozzle is adapted to atomize said liquid into droplets at a pressure within the range of 35-140 bar.

42. The method according to claim 40, wherein said at least one nozzle is adapted to atomize said liquid into droplets in the range of 20-500 microns.

43. Computer program product loadable into a memory of a digital computer device, including software code portions for performing steps of the method of claim 22 when said computer program product is run on said computer device.

* * * * *

UNITED STATES PATENT AND TRADEMARK OFFICE
CERTIFICATE OF CORRECTION

PATENT NO. : 7,428,818 B2
APPLICATION NO. : 11/224306
DATED : September 30, 2008
INVENTOR(S) : Hjerpe

Page 1 of 1

It is certified that error appears in the above-identified patent and that said Letters Patent is hereby corrected as shown below:

<u>In Column 15</u>
At line 2, please change "1ine" to --line--; and at line 45, please insert --includes injecting a spray-- after "liquid".

Signed and Sealed this

Twenty-fourth Day of March, 2009

JOHN DOLL
*Acting Director of the United States Patent and Trademark Office*